(12) United States Patent
Gault

(10) Patent No.: US 9,797,611 B2
(45) Date of Patent: Oct. 24, 2017

(54) COMBINATION AIR AND GROUND SOURCE HEATING AND/OR COOLING SYSTEM

(71) Applicant: Atlas L.C. Heating & A/C, Front Royal, VA (US)

(72) Inventor: Robert Gault, Front Royal, VA (US)

(73) Assignee: Atlas L.C. Heating & A/C, Front Royal, VA (US)

( * ) Notice: Subject to any disclaimer, the term of this patent is extended or adjusted under 35 U.S.C. 154(b) by 422 days.

(21) Appl. No.: 14/548,930

(22) Filed: Nov. 20, 2014

(65) Prior Publication Data

US 2015/0135744 A1 May 21, 2015

Related U.S. Application Data

(60) Provisional application No. 61/907,101, filed on Nov. 21, 2013.

(51) Int. Cl.
| | |
|---|---|
| *F24F 5/00* | (2006.01) |
| *F24D 5/12* | (2006.01) |
| *F24D 19/10* | (2006.01) |
| *F25B 13/00* | (2006.01) |

(52) U.S. Cl.
CPC .............. *F24F 5/0046* (2013.01); *F24D 5/12* (2013.01); *F24D 19/1087* (2013.01); *F25B 13/00* (2013.01); *F24D 2200/11* (2013.01); *F24D 2200/123* (2013.01); *F24D 2200/32* (2013.01); *F24F 2005/0057* (2013.01); *F25B 2313/002* (2013.01); *F25B 2313/0293* (2013.01); *F25B 2313/0294* (2013.01); *F25B 2700/2106* (2013.01); *Y02B 10/40* (2013.01)

(58) Field of Classification Search
CPC .............. F25B 13/00; F25B 2313/0252; F25B 2400/0403; F24F 5/0046
See application file for complete search history.

(56) References Cited

U.S. PATENT DOCUMENTS

| | | |
|---|---|---|
| 2,584,573 A | 2/1952 | Gay |
| 4,091,636 A | 5/1978 | Margen |
| 4,179,894 A | 12/1979 | Hughes |
| 4,187,687 A | 2/1980 | Savage |
| 4,363,218 A | 12/1982 | Nussbaum |
| 5,461,876 A | 10/1995 | Dressler |
| 5,937,665 A | 8/1999 | Kiessel et al. |
| 5,983,660 A | 11/1999 | Kiessel et al. |

(Continued)

FOREIGN PATENT DOCUMENTS

CN 102331053 1/2012

*Primary Examiner* — Cassey D Bauer
(74) *Attorney, Agent, or Firm* — Diederiks & Whitelaw, PLC

(57) ABSTRACT

A combination air and ground source heating and/or cooling system. The system includes an indoor unit, an outdoor unit and an in-ground unit, each of which has a coil, an inlet line and an outlet line. The system also comprises a flow connector, a coupling and a controller. The controller is configured to control the flow connector and coupling so that the system is selectively operable in three different modes. In the first mode, refrigerant bypasses the coil of the outdoor unit, while, in the second mode, refrigerant bypasses the coil of the in-ground unit. In the third mode, refrigerant flows through the coils of the in-ground and outdoor units.

11 Claims, 2 Drawing Sheets

(56) References Cited

U.S. PATENT DOCUMENTS

| | | |
|---|---|---|
| 6,167,715 B1 | 1/2001 | Hebert |
| 7,228,696 B2 | 6/2007 | Ambs et al. |
| 2011/0042057 A1* | 2/2011 | Li .................. F24F 5/0046 165/253 |

* cited by examiner

COMBINATION AIR AND GROUND SOURCE HEATING AND/OR COOLING SYSTEM

CROSS-REFERENCE TO RELATED APPLICATIONS

The present application claims the benefit of U.S. Provisional Application Ser. No. 61/907,101 filed Nov. 21, 2013 entitled "Combination Air and Ground Source Heating and/or Cooling System".

BACKGROUND OF THE INVENTION

Field of the Invention

The present invention is concerned with the field of heating, ventilation and air conditioning (HVAC) and, more particularly, with a heating and/or cooling system which relies on a combination of air and ground source units.

Description of the Related Art

In the HVAC field, both air and ground source heating systems are known and can represent efficient heating and cooling systems under ideal conditions. As such ideal conditions are rarely obtainable or sustainable, and each of air and ground source heating systems will present certain advantages, HVAC installers typically rely on prevailing environmental conditions in determining the type of system that is best suited for a particular application.

In general, air source heat pump systems can be very efficient in areas where the outside temperature does not fall below 35° F. More specifically, under these warmer conditions, air source heat pump systems can extract a sufficient amount of ambient heat for use in heating the inside of a home or other building. Unfortunately, as many areas experience colder temperatures during certain periods of the year, an air source heat pump system will be subject to freezing and, therefore, is invariably used in combination with both a defrost system and an auxiliary heat source, such as an electric resistance heater element or an oil or gas burning system. Of course, it is also known to run an air source heat pump system in reverse for cooling purposes. Again, this operation can be efficient so long as the outside temperature is not excessive.

Ground source heat pumps are simply less affected by rapid changes in air temperature because their heat transfer takes place in the ground. Here the warmer and more consistent earth temperatures can provide an adequate heat exchange for both heating and cooling purposes. From this standpoint, ground source heat pumps can be even more efficient than air source heating systems and can be defrosted simply by shutting down for a requisite period of time. However, ground source heating systems are not without their drawbacks and are still typically supplemented by gas, oil or electric resistance heating units. In particular, ground source heat pumps are more susceptible to counterproductive outputs, high head pressures, damage to overheating subterranean coils, flow restrictions and compressor failures based on excessive run times in either heating or cooling modes of operation. On the other hand, as an air source heat pump generally has a sufficient supply of outdoor air for heat exchange purposes, long run times have little or no negative effect. Actually, the ability to operate with longer run times is also advantageous as the air source units can be sized smaller and can more effectively address humidification and other comfort issues.

In any event, both of these types of known systems have their advantages and disadvantages. Combination air and ground systems have been proposed but, to date, are not considered to be configured to operate at optimal efficiency. Therefore, a versatile combination heating and cooling system which could be effectively utilized under a wide range of environmental conditions, with the overall systems being capable of being factory built or retrofit, would be beneficial.

SUMMARY OF THE INVENTION

The present invention is directed to a combination air and ground source heating and/or cooling system that is configured to automatically switch between various operating modes, including air source, ground source and dual source operating modes. In accordance with a simple form of the invention employed for cooling purposes, a ground loop system is line tapped into the path of an outdoor condensing coil of a refrigerant flowing compressor pump driven air conditioning system, thereby allowing the refrigerant to flow through both the air cooled condenser and the ground loops to provide a more efficient cooling system. A similar procedure can be applied to a heat pump system to provide an improved heating and cooling system. In addition, temperature and other operational parameters are monitored and used to automatically regulate the flow paths to assure optimal operation.

In addition, the invention provides for enhanced mechanical and electrical controls to insure a durable and more efficient system, overcome certain potential problems, and adapt to the high efficiency components of advanced heat pump/air conditioner technology. These additional features include an oil separator to prevent refrigeration oil from being trapped in the ground loops which would cause loss of efficiency and compressor failure, a refrigerant compensator to allow the system to be used with mini-split heat pumps and multistage and inverter driven compressors, a temperature comparing relay to measure a differential from line temperatures and command refrigerant flow controls, and the use of an electronic expansion valve (EXV) which can work in addition to thermal expansion valves (TXV) to regulate refrigerant flow and superheating. Also, when a two-speed compressor is used, a solenoid valve can be incorporated that only releases the earth field with a second stage of the compressor so that stage one is air source only and stage two includes air and ground source technology.

Preferably, a combination air and ground source heating and/or cooling system comprises an indoor unit, an outdoor unit and an in-ground unit. Each of the units includes a coil, an inlet line and an outlet line. The system also comprises a flow connector, a coupling and a controller. The flow connector connects the outlet line of the indoor unit, the inlet line of the outdoor unit and the inlet line of the in-ground unit. The coupling connects the inlet line of the indoor unit, the outlet line of the outdoor unit and the outlet line of the in-ground unit. The controller is configured to control the flow connector and coupling so that the system is selectively operable in three different modes. In the first mode, refrigerant bypasses the coil of the outdoor unit, while, in the second mode, refrigerant bypasses the coil of the in-ground unit. In the third mode, refrigerant flows through the coils of the in-ground and outdoor units.

A method of installing a combination air and ground heating and/or cooling system is also provided. If the system includes an outdoor unit, then an in-ground unit is installed. If the system includes an in-ground unit, then an outdoor unit is installed. Additionally, a flow connector, coupling and controller are installed. The flow connector connects the outlet line of the indoor unit, the inlet line of the outdoor unit and the inlet line of the in-ground unit. The coupling connects the inlet line of the indoor unit, the outlet line of the outdoor unit and the outlet line of the in-ground unit. The controller is configured to control the flow connector and coupling so that the system is selectively operable in three different modes. In the first mode, refrigerant bypasses the coil of the outdoor unit, while, in the second mode, refrigerant bypasses the coil of the in-ground unit. In the third mode, refrigerant flows through the coils of the in-ground and outdoor units.

Additional objects, features and advantages of the present invention will become more readily apparent from the following detailed description of preferred embodiments when taken in conjunction with the drawings wherein like reference numerals refer to corresponding parts in the several views.

DETAILED DESCRIPTION OF PREFERRED EMBODIMENTS

Figure 1:
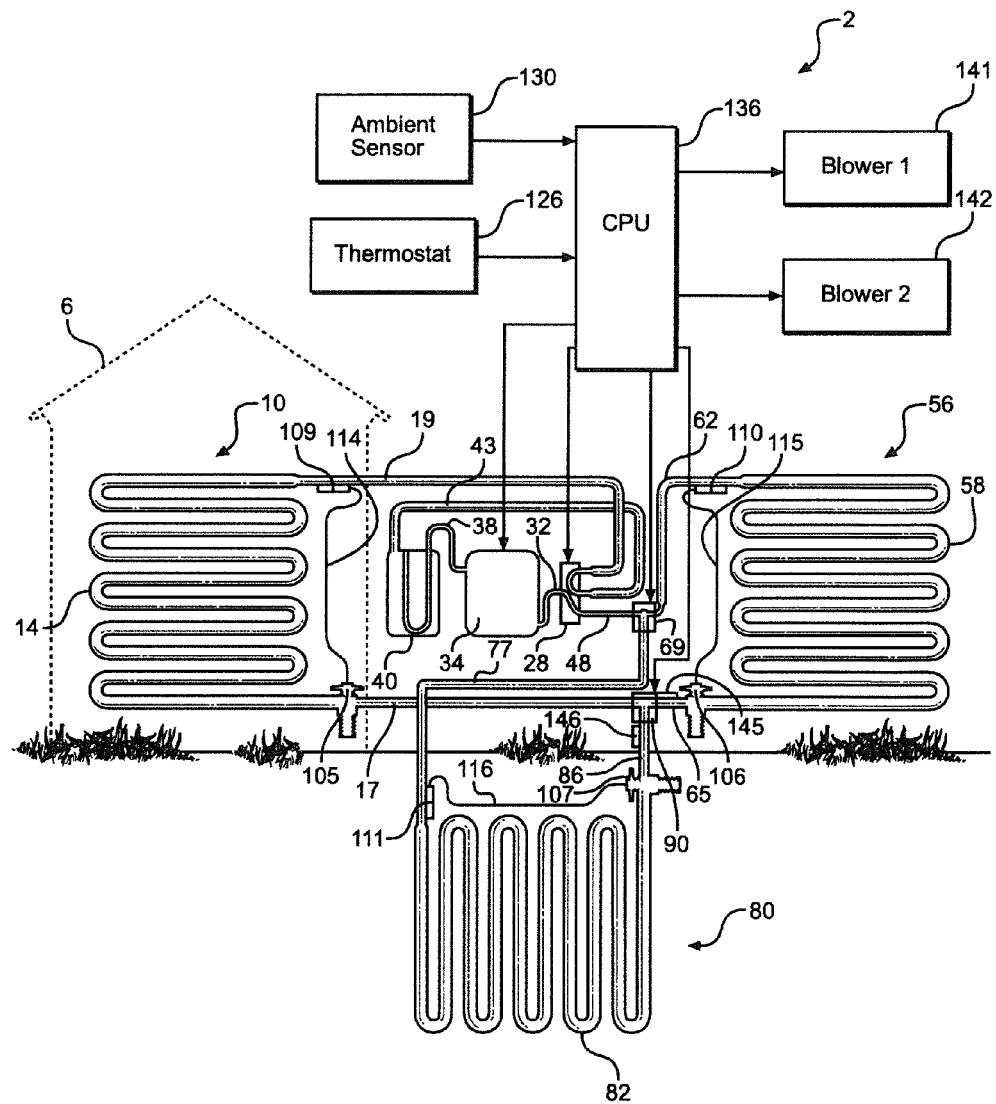
FIG. 1 is a schematic view of a combination air and ground source heating and/or cooling system constructed in accordance with the present invention.

With initial reference to the schematic of FIG. 1, the combination heating and cooling system of the invention is generally indicated at 2. For purposes of describing the invention, particular reference will be made to combination heating and cooling system 2 functioning in a cooling mode of operation. However, as will also be pointed out further below, the flow through combination heating and cooling system 2 can be reversed in order to place system 2 in a heating mode.

As depicted, a building 6 is provided with an indoor heating/cooling unit 10 including an inside coil 14. In the cooling mode, inside coil 14 has an associated inlet line 17 and outlet line 19. Outlet line 19 leads to a reversing valve 28. In essence, reversing valve 28 can be shifted to change between heating and cooling modes of operation for system 2. However, as the structure and general operation of reversing valve 28 is known in the art, it will not be detailed further here. Reversing valve 28 receives a flow of refrigerant through a supply line 32 coming from a compressor 34, which draws refrigerant through an intake 38 from an accumulator 40. Also interconnected between reversing valve 28 and accumulator 40 is a return line 43. Finally, leading from reversing valve 28 is an output line 48.

Disposed outside of building 6 is an outdoor unit 56 including a coil 58 having an associated inlet line 62 and outlet line 65. In a preferred embodiment of the invention, outdoor unit 56 is constituted by a heat pump unit which functions as an efficient heat exchange source in a manner known in the art. In a standard outdoor heat pump system, the inlet line to the heat pump would be directly connected to the reversing valve. As shown in accordance with the present invention, both output line 48 of reversing valve 28 and inlet line 62 of outdoor unit 56 are linked to a flow connector 69. At this point, it should be recognized that flow connector 69 can take various forms in accordance with the invention, with those forms ranging from a fixed flow joint, such as a T-shaped flow connection, to an adjustable flow joint, such as a solenoid controlled, multi-position valve as employed in connection with a preferred embodiment of the invention as will be detailed more fully below.

Also shown stemming from flow connector 69 is an inlet line 77 of an in-ground unit 80, with in-ground unit 80 including a subterranean coil 82 having an associated outlet line 86. Outlet line 86 of in-ground unit 80 is connected to outlet line 65 of outdoor unit 56 at a coupling 90. In addition, coupling 90 is also in fluid communication with inlet line 17 of indoor unit 10. As with flow connector 69, coupling 90 can take various forms within the scope of the invention, including a fixed T-shaped coupling or a multi-position solenoid valve that can be selectively positioned as detailed further below.

As will become more fully evident below, with the combination heating and cooling system of the invention, a temperature in building 6 can be regulated by use of outdoor unit 56, in-ground unit 80 or both. However, before describing the operation of system 2, it should first be noted that the overall system 2 includes certain basic HVAC structure, which is not illustrated in FIG. 1 for the sake of simplicity, as well as additional structure that is considered to enhance the overall operation of system 2. For instance, although not shown, associated with each of coils 14, 58 and 82 would be a thermal expansion valve (TXV), which functions in a manner known in the art. However, as shown in this figure, system 2 can also employ electronic expansion valves 105-107 (EXVs), having associated sensors 109-111 and related control wires 114-116 for indoor, outdoor and subterranean coils 14, 58 and 82 respectively, which work in addition to the thermal expansion valves to regulate refrigerant flow and superheating. In connection with the main controls of system 2, a thermostat 126 and an ambient temperature sensor 130 are linked to a controller or CPU 136. In general, thermostat 126 would be located in building 6 and employed, in a known manner, to establish a desired cooling or heating mode of operation, as well as to set a desired goal temperature, for system 2. However, the manner in which system 2 achieves the desired goal temperature is actually established by controller 136, which preferably regulates the operation of reversing valve 28, compressor 34, flow connector 69 and coupling 90, as well as blowers 141 and 142 provided for indoor and outdoor units 10 and 56 respectively, as will now be detailed.

Figure 2:
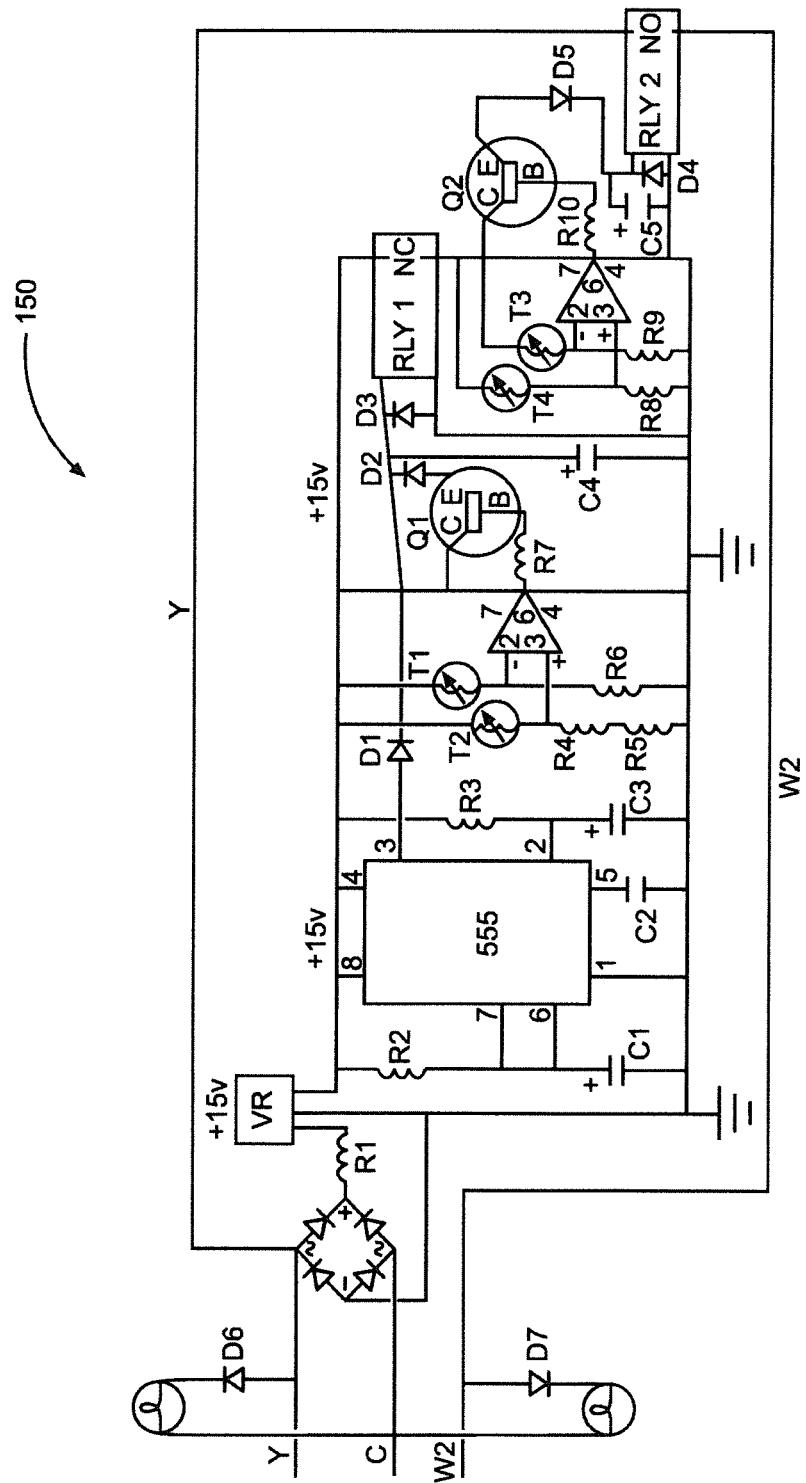
FIG. 2 depicts a temperature relay circuit employed in connection with an aspect of the invention.

As indicated above, it is an object of the invention to exploit the advantages of both air source and ground source units, and the invention actually combines these different sources with synergistic results. In the broadest sense, an existing air source arrangement can be retrofitted with an additional ground source arrangement (or vice versa) with the inclusion of flow connector 69 and coupling 90. In its simplest form, the air and ground sources would be connected in parallel to deliver an effective heat exchange fluid to the inlet line 17 of indoor coil 14. However, in accordance with a preferred embodiment of the invention, operational parameters are sensed and input into controller 136 to effectively regulate reversing valve 28, compressor 34, flow connector 69, coupling 90, and blowers 141 and 142 such that either a select one or both of outdoor and in-ground units 56 and 80 actually contribute to regulating the temperature in building 6 at any given time. In particular, each of flow connector 69 and coupling 90 can be electronically shifted to a first position, wherein refrigerant only flows from reversing valve 28 to outside coil 58 and then to inside coil 14 while bypassing subterranean coil 82, a second position wherein refrigerant only flows from reversing valve 28 to subterranean coil 82 and then to inside coil 14 while bypassing outside coil 58, and a third position wherein the refrigerant flows in parallel to each of the outside coil 58 and subterranean coil 82 and then to inside coil 14. The selection of a given operational mode is based on running system 2 most efficiently which, in turn, is based on temperature readings supplied to controller 136 through not only ambient temperature sensor 130 but also temperature readings from line sensors, such as those shown at 145 and 146 from outlet lines 65 and 86 respectively. One preferred temperature relay circuit used for this purpose is shown in FIG. 2 at 150. Here temperature relay circuit 150 measures a differential from line temperatures through sensors 145 and 146 and provides comparative signals to controller 136 for establishing desired refrigerant flow controls. That is, in combination with the other readings, the controller 136 can automatically determine the optimal operating characteristics for the overall system and control the outputs from controller 136 to provide the most efficient form of heating or cooling, such as from use of the outdoor unit 56 alone, the in-ground unit 80 alone, or a combination of both the outdoor and in-ground units 56 and 80. In this way, the invention provides for enhanced mechanical and electrical controls to ensure a durable and more efficient system, overcomes certain potential problems which are associated with using either unit type alone, and can readily be applied to high efficiency components of advanced heat pump/air conditioner technology.

As previously discussed, in addition to the cooling modes described above, system 2 can of course be operated in corresponding heating modes. Specifically, each of flow connector 69 and coupling 90 can be electronically shifted to a first position, wherein refrigerant only flows from outside coil 58 to reversing valve 28 and then to inside coil 14 while bypassing subterranean coil 82; a second position, wherein refrigerant only flows from subterranean coil 82 to reversing valve 28 and then to inside coil 14 while bypassing outside coil 58; and a third position, wherein the refrigerant flows in parallel to each of outside coil 58 and subterranean coil 82, to reversing valve 28 and then to inside coil 14.

Although described with reference to preferred embodiments of the invention, it should be readily understood that various changes and/or modifications can be made to the invention without departing from the spirit thereof. For instance, the invention can also employ an oil separator to prevent refrigeration oil from being trapped in the ground loops, which would cause loss of efficiency and compressor failure, as well as a refrigerant compensator to allow the system to be used with mini-split heat pumps and multistage and inverter driven compressors. Also, when a two-speed compressor is used, a solenoid valve can be incorporated that only releases the earth field with a second stage of the compressor so that stage one is air source only and stage two includes air and ground source technology. In any case, it should be readily apparent that the invention lends itself very well to retrofitting existing heating/cooling systems including either an outdoor or in-ground unit and establishes an extremely versatile and environmentally universal combination heating and/or cooling system.

The invention claimed is:

1. A combination air and ground source heating and/or cooling system comprising:
    an indoor unit including a coil, an inlet line and an outlet line;
    an outdoor unit including a coil, an inlet line and an outlet line;
    an in-ground unit including a coil, an inlet line and an outlet line;
    a flow connector that connects the outlet line of the indoor unit, the inlet line of the outdoor unit and the inlet line of the in-ground unit;
    a coupling that connects the inlet line of the indoor unit, the outlet line of the outdoor unit and the outlet line of the in-ground unit;
    a compressor;
    a reversing valve;
    an ambient temperature sensor;
    two line sensors, one of the two line sensors being located at each of the outlet line of the outdoor unit and the outlet line of the in-ground unit; and
    a controller configured to control the flow connector, the coupling and the reversing valve so that the system is selectively operable: in a first mode, wherein refrigerant bypasses the coil of the outdoor unit; in a second mode, wherein refrigerant bypasses the coil of the in-ground unit; in a third mode, wherein refrigerant flows through the coils of the in-ground and outdoor unit; and in additional, reverse flow modes, wherein the first, second, third and additional, reverse flow modes cover both cooling and heating modes and wherein the controller is configured to select one of the cooling or heating modes based on temperature readings received from the ambient temperature and line sensors.

2. The system of claim 1, wherein the additional, reverse flow modes include a fourth mode, wherein refrigerant bypasses the coil of the outdoor unit; a fifth mode, wherein refrigerant bypasses the coil of the in-ground unit; and a sixth mode, wherein refrigerant flows through the coils of the in-ground and outdoor units.

3. The system of claim 2, wherein the controller is configured to control the flow connector, coupling and reversing valve so that:
    in the first mode, refrigerant flows from the compressor to the coil of the in-ground unit and then to the coil of the indoor unit while bypassing the coil of the outdoor unit;
    in the second mode, refrigerant flows from the compressor to the coil of the outdoor unit and then to the coil of the indoor unit while bypassing the coil of the in-ground unit;
    in the third mode, refrigerant flows from the compressor to the coils of the in-ground and outdoor units and then to the coil of the indoor unit;
    in the fourth mode, refrigerant flows from the coil of the in-ground unit to the compressor and then to the coil of the indoor unit while bypassing the coil of the outdoor unit;
    in the fifth mode, refrigerant flows from the coil of the outdoor unit to the compressor and then to the coil of the indoor unit while bypassing the coil of the in-ground unit; and
    in the sixth mode, refrigerant flows from the coils of the in-ground and outdoor units to the compressor and then to the coil of the indoor unit.

4. The system of claim 2, wherein the first, second and third modes are cooling modes and the fourth, fifth and sixth modes are heating modes, or wherein the first, second and third modes are heating modes and the fourth, fifth and sixth modes are cooling modes.

5. The system of claim 4, wherein the outdoor unit and in-ground units are heat pumps.

6. The system of claim 5, wherein the flow connector and coupling are solenoid controlled, multi-position valves.

7. The system of claim 6, further comprising three electronic expansion valves, wherein a respective one of the three electronic expansion valves is located at each of the inlet line of the indoor unit, the outlet line of the outdoor unit and the outlet line of the in-ground unit.

8. A method of providing heating and/or cooling with a combination air and ground heating and/or cooling system including an indoor unit having a coil, inlet line and outlet line; an outdoor unit having a coil, inlet line and outlet line; an in-ground unit having a coil, inlet line and outlet line; a flow connector that connects the outlet line of the indoor unit, the inlet line of the outdoor unit and the inlet line of the in-ground unit; a coupling that connects the inlet line of the indoor unit, the outlet line of the outdoor unit and the outlet line of the in-ground unit; a compressor; a reversing valve; an ambient temperature sensor; two line sensors, one of the two line sensors being located at each of the outlet line of the outdoor unit and the outlet line of the in-ground unit; and a controller configured to control the flow connector, coupling and reversing valve so that the system is operable in a first mode, a second mode, a third mode and additional, reverse flow modes, the method comprising:

selecting, with the controller, between the first, second, third and additional, reverse flow modes covering both cooling and heating modes, wherein the controller selects one of the cooling or heating modes based on temperature readings received from the ambient temperature and line sensors; and operating in the selected mode, wherein:

operating the system in the first mode includes causing refrigerant to bypass the coil of the outdoor unit;

operating the system in the second mode includes causing refrigerant to bypass the coil of the in-ground unit; and operating the system in the third mode includes causing refrigerant to flow through the coils of the in-ground and outdoor units.

9. The method of claim 8, wherein:

the additional, reverse flow modes include a fourth mode, a fifth mode and a sixth mode; said method further comprising:

selecting between the first, second, third and additional, reverse flow modes includes selecting between the first, second, third, fourth, fifth and sixth modes;

operating the system in the fourth mode includes causing refrigerant to bypass the coil of the outdoor unit;

operating the system in the fifth mode includes causing refrigerant to bypass the coil of the in-ground unit; and operating the system in the sixth mode includes causing refrigerant to flow through the coils of the in-ground and outdoor units.

10. The method of claim 9, wherein:

operating the system in the first mode further includes causing refrigerant to flow from the compressor to the coil of the in-ground unit and then to the coil of the indoor unit while bypassing the coil of the outdoor unit;

operating the system in the second mode further includes causing refrigerant to flow from the compressor to the coil of the outdoor unit and then to the coil of the indoor unit while bypassing the coil of the in-ground unit;

operating the system in the third mode further includes causing refrigerant to flow from the compressor to the coils of the in-ground and outdoor units and then to the coil of the indoor unit;

operating the system in the fourth mode further includes causing refrigerant to flow from the coil of the in-ground unit to the compressor and then to the coil of the indoor unit while bypassing the coil of the outdoor unit;

operating the system in the fifth mode further includes causing refrigerant to flow from the coil of the outdoor unit to the compressor and then to the coil of the indoor unit while bypassing the coil of the in-ground unit; and operating the system in the sixth mode further includes causing refrigerant to flow from the coils of the in-ground and outdoor units to the compressor and then to the coil of the indoor unit.

11. The method of claim 9, wherein the first, second and third modes are cooling modes and the fourth, fifth and sixth modes are heating modes, or wherein the first, second and third modes are heating modes and the fourth, fifth and sixth modes are cooling modes.

\* \* \* \* \*